United States Patent
Tovar

(10) Patent No.: US 7,312,436 B2
(45) Date of Patent: Dec. 25, 2007

(54) OPTICAL POSITION MEASURING SYSTEM WITH A DETECTOR ARRANGEMENT AND MEASURING GRADUATION TO PRODUCE PARTIAL FILTERING OF UNDESIRED HARMONICS

(75) Inventor: Heinz Tovar, Siegsdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/210,122

(22) Filed: Aug. 23, 2005

(65) Prior Publication Data

US 2006/0043274 A1    Mar. 2, 2006

(30) Foreign Application Priority Data

Aug. 31, 2004   (DE)   ............ 10 2004 041 950

(51) Int. Cl.
*G01D 5/34*   (2006.01)
(52) U.S. Cl. .................... 250/231.13
(58) Field of Classification Search .................
250/231.13–231.18, 237 G, 237 R
See application file for complete search history.

(56) References Cited

U.S. PATENT DOCUMENTS

| | | | | |
|---|---|---|---|---|
| 3,427,463 A | 2/1969 | Weyrauch | ............... | 250/237 R |
| 4,782,229 A | 11/1988 | Ernst | ............... | 250/237 G |
| 5,332,896 A | 7/1994 | Holzapfel | ............... | 250/237 G |
| 5,604,345 A | 2/1997 | Matsuura | ............... | 250/237 G |
| 5,750,984 A * | 5/1998 | Ieki | ............... | 250/231.16 |
| 5,889,280 A * | 3/1999 | Matsuura | ............... | 250/237 G |
| 2003/0047673 A1 * | 3/2003 | Thorburn et al. | ...... | 250/231.13 |
| 2004/0135076 A1 * | 7/2004 | Martenson et al. | .... | 250/231.13 |
| 2004/0218190 A1 * | 11/2004 | Holzapfel | ............... | 356/498 |

FOREIGN PATENT DOCUMENTS

| | | |
|---|---|---|
| DE | 1 282 988 | 11/1968 |
| DE | 103 19 609 A1 | 11/2004 |
| EP | 0 250 711 A2 | 1/1988 |
| EP | 0 541 827 B1 | 4/1995 |
| EP | 0 714 015 B1 | 6/2001 |
| GB | 2 116 313 A | 9/1983 |

* cited by examiner

*Primary Examiner*—Thanh X. Luu
(74) *Attorney, Agent, or Firm*—Brinks Hofer Gilson & Lione

(57) ABSTRACT

An optical position measuring system that includes a measuring graduation and a scanning unit that is movable in relation to the measuring graduation in a measuring direction. The scanning unit includes a light source that generates light towards the measuring graduation so that scanning signals result from an interaction of the light with the measuring graduation and an opto-electronic detector arrangement has a plurality of detector element units, whose geometric shape and/or arrangement has been selected in such a way that through them at least a partial filtering of undesired harmonics out of the scanning signals results. The measuring graduation includes an arrangement of graduation areas with different optical properties, which is periodic in the measuring direction and has a periodicity TPM and which has been selected in such a way that through them at least a partial filtering of undesired harmonics out of the scanning signals results.

12 Claims, 4 Drawing Sheets

| # OPTICAL POSITION MEASURING SYSTEM WITH A DETECTOR ARRANGEMENT AND MEASURING GRADUATION TO PRODUCE PARTIAL FILTERING OF UNDESIRED HARMONICS

Applicant claims, under 35 U.S.C. §119, the benefit of priority of the filing date of Aug. 31, 2004 of a German patent application, copy attached, Serial Number 10 2004 041 950.7, filed on the aforementioned date, the entire contents of which is incorporated herein by reference.

BACKGROUND OF THE INVENTION

1. Technical Field

The present invention relates to an optical position measuring system for generating position-dependent scanning signals, which in particular provides scanning signals free of harmonics and includes a measuring graduation and a scanning unit, which are arranged to be movable in relation to each other in a measuring direction.

2. Background Information

Known optical position measuring systems for generating scanning signals in the form of periodic incremental signals customarily include a measuring graduation, as well as a scanning unit, which is arranged to be movable in a measuring direction relative to the measuring graduation. In turn, two objects, for example parts of a machine, whose relative position is to be determined by the position measuring system, are connected with the measuring graduation and the scanning unit. The generated scanning signals are fed to an electronic follow-up device for further processing, for example a numeric machine tool control or a servo drive control.

An arrangement of graduation areas of different optical properties, which is periodic in the measuring direction, is provided on the side of the linear or rotary measuring graduation. In the case of a transmitted light system, transparent and opaque graduation areas are here alternatingly arranged on the side of the measuring graduation, in the case of an incident light system highly reflective graduation areas and low-reflecting graduation areas, etc. For generating the scanning signals, the scanning unit includes at least a light source and an opto-electronic detector arrangement. Depending on the optical scanning principle employed, one or several scanning graduations can furthermore be arranged in the scanning beam path.

As a rule, the analog scanning signals generated in this way do not have an ideal signal form as a result of various influences, i.e. customarily no sinusoidal scanning signals exist. For example, inexactitude of the measuring graduation used, fluctuations in the scanning distance, or resultant diffraction effects are considered to be the cause of such deviations. Therefore the results are undesired harmonic portions in the scanning signals. However, signals which are free of harmonics to the greatest possible extent and ideally have a sinusoidal shape are desirable for error-free further processing of the scanning signals. This applies in particular if a signal interpolation is required in the position measuring system or the electronic follow-up device, by which the signal period provided by the scanning signals is again electronically sub-divided.

A multitude of solutions for reducing the harmonic content have already become known. The various attempts for harmonic filtering envision, for example, actions on the part of a scanning graduation or in connection with the measuring graduation. The respective graduations are modified in a suitable manner in order to minimize the undesired harmonic portions of the generated scanning signals. This can be done by a modification of the periodic arrangement of the graduation structures and/or by a suitable geometry of the graduation structures. In this connection the publications GB 2 116 313 A or EP 541 827 B1 are to be mentioned as examples.

Furthermore, a position measuring system is known from DE 1 282 988, wherein certain measures for harmonic filtering are being taken in connection with the measuring graduation, as well as in connection with the scanning graduation.

Various possibilities are furthermore known for reducing the harmonic content of the scanning signals by taking action in connection with the detector arrangement used. In this connection reference is made to EP 250 711 A2 or EP 714 015 B1. In these publications it is proposed to perform a defined harmonic filtering in the detector arrangement by a suitable arrangement and dimensioning of the individual detector elements. Undesired harmonic portions can be very efficiently eliminated from the scanning signals by such steps in connection with the detector elements. However, it is problematical here that respectively different embodiments or designs of the detector arrangement are required for different scanning configurations. If now such detector arrangements are intended to be employed in an integrated form in so-called OPTO-ASICs in connection with the scanning unit, a significant outlay regarding necessary changes in the detector arrangement then results in case of possibly required changes because of different filtering requirements. However, in case of using OPTO-ASICs it is basically desirable for them to be available as unchanged as possible for diverse applications.

BRIEF SUMMARY

It is therefore an object of the present invention to disclose an optical position measuring system which assures a dependable harmonic filtering in the resultant scanning signals. In the course of this, a flexible adaptation of the steps provided for harmonic filtering to various scanning configurations should be possible.

This object is attained by an optical position measuring system that includes a measuring graduation and a scanning unit that is movable in relation to the measuring graduation in a measuring direction. The scanning unit includes a light source that generates light towards the measuring graduation so that scanning signals result from an interaction of the light with the measuring graduation and an opto-electronic detector arrangement has a plurality of detector element units, whose geometric shape and/or arrangement has been selected in such a way that through them at least a partial filtering of undesired harmonics out of the scanning signals results. The measuring graduation includes an arrangement of graduation areas with different optical properties, which is periodic in the measuring direction and has a periodicity TPM and which has been selected in such a way that through them at least a partial filtering of undesired harmonics out of the scanning signals results.

In accordance with the present invention it is now provided to perform a partial filtering of undesired harmonic portions in connection with the opto-electronic detector arrangement, as well as a partial filtering of undesired harmonic portions in connection with the measuring graduation used. Thus, a specific partial filtering functionality can be assured by the geometric shape and/or arrangement of detector elements in connection with the scanning unit.

Moreover, a further partial filtering functionality in connection with the measuring graduation can be assured if the shape and/or arrangement of the graduation areas is selected to correspond to the filtering requirements.

It is possible in this way in particular to design an opto-electronic detector arrangement in regard to a defined partial filtering functionality, which is basically suitable for a number of different scanning configurations. Moreover, by the additional filtering steps in connection with the measuring graduation used, the desired filtering effect can be individually and flexibly optimized for different scanning configurations. No elaborate additional interferences with the existing design of the opto-electronic detector arrangement are needed for this.

Several options exist within the scope of the present invention in regard to the geometric design of the detector units in the opto-electronic detector arrangement. It is thus possible by providing a suitable contour of the detector elements of the detector element units to assure a partial filtering effect. However, this can alternatively also be achieved by the suitable width of a respective detector element unit, or by the suitable connection of detector elements in blocks. These steps for the desired partial filtering in connection with the detector arrangement can of course also be suitably combined.

In the case of a mirror-symmetrical arrangement of the detector elements in relation to an axis of symmetry of the detector arrangement it is furthermore possible to achieve a specific tolerance in connection with the required adjustment of the detector arrangement in relation to the measuring graduation. The result is a simpler assembly of the position measuring system.

Furthermore, different options exist in connection with the measuring graduation for realizing the desired partial filtering effect. It is therefore possible to provide, besides a tilted arrangement of graduation areas by a defined tilt angle, an angled, or V-shaped arrangement of the graduation areas in relation to an axis of symmetry. Alternatively it is also possible to design the contour of the graduation areas in a sinusoidal shape.

The steps in accordance with the present invention can of course be employed in connection with linear, as well as rotary position measuring systems. The various steps can also be realized with transmitted light and incident light systems.

Further advantages, as well as details of the present invention ensue from the following description of exemplary embodiments by the attached drawings.

DETAILED DESCRIPTION OF THE PREFERRED EMBODIMENTS

Figure 1:
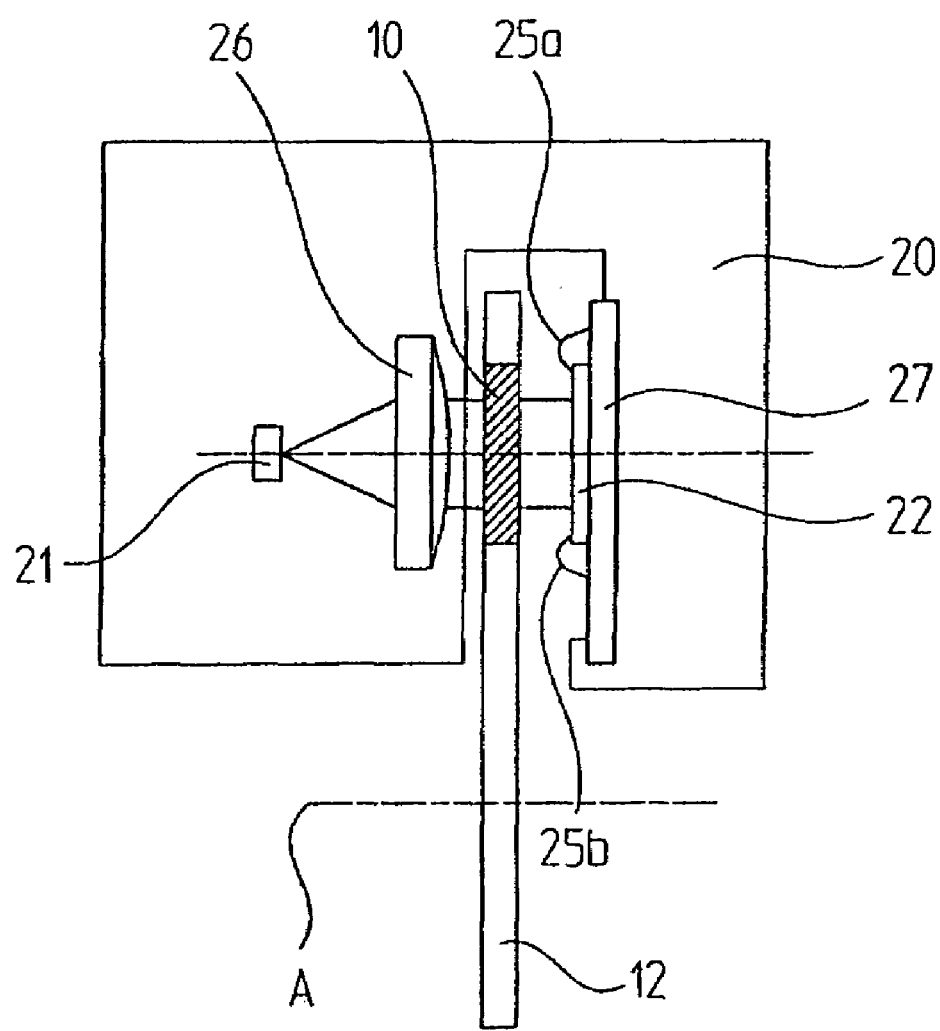
FIG. 1 shows a schematic plan view of an exemplary embodiment of an optical position measuring system in accordance with the present invention used for detecting a rotary movement.

An exemplary embodiment of an optical position measuring system in accordance with the present invention, in which a suitably designed opto-electronic detector arrangement 22 and a measuring graduation 10 matched to it, is represented in a schematic lateral view in FIG. 1. In accordance with the present invention, specific partial filtering effects in regard to the undesired harmonic portion of the scanning signals are the result of the detector arrangement 22, as well as the measuring graduation 10.

The exemplary embodiment represented is a rotary position measuring system, by which it is intended to determine the position, or the angle of rotation of a graduated disk 12 rotating around the axis A. In this example, the graduated disk 12 has a measuring graduation 10 arranged in the form of a ring, which is scanned by transmitted light. In this case the measuring graduation 10 is embodied in the form of a sequence, periodic in the measuring direction x, of graduation areas which are transparent (to light) and opaque (to light). In what follows, the width of an adjoining pair of transparent and opaque graduation areas of the measuring graduation 10 will be called periodicity TPM of the measuring graduation 10.

For generating position-dependent scanning signals, the position measuring system represented furthermore includes a scanning unit 20 with a light source 21, an optical collimator device 26 arranged in front of the light source 21, as well as a scanning plate 27, on which the detector arrangement 22 is placed in the detection plane. The scanning signals result from an interaction of light generated by the light source 21 with the measuring graduation 10. The detector arrangement 22 is connected by bonding wires 25a, 25b with electrically conductive strip conductors on the scanning plate 27. In case of a relative movement between the measuring graduation 10 and the scanning unit 20, a periodic fringe pattern generated in the detection plane, which is modulated as a function of the displacement, is scanned by the opto-electronic detector arrangement 22, which will be described in detail in what follows. The periodic, analog scanning signals or incremental signals intended for further processing result from the opto-electronic scanning of the fringe pattern.

The scanning signals which are generated by the position measuring system in accordance with the present invention and, if necessary, are already processed, are fed via signal transmission lines, also not represented, to an electronic follow-up device, which for example performs control and/or regulating tasks.

A rotary position measuring system is represented in the exemplary embodiment of FIG. 1, wherein the measuring direction x, i.e. the relative displacement direction of the measuring graduation 10 and the scanning unit 20, extends along a circular path. The generation of the position-dependent scanning signals takes place by so-called transmitted light scanning. However, the steps in accordance with the present invention, which will be explained in what follows, can also be realized in connection with linear position measuring systems, wherein the measuring direction x extends in a linear direction or along a straight line. The same applies to alternative scanning principles, such as, for example, incident light scanning designed with highly-reflecting and low reflecting graduation areas of the measuring graduation and/or alternative optical scanning beam paths with additionally provided scanning gratings.

Figure 2:
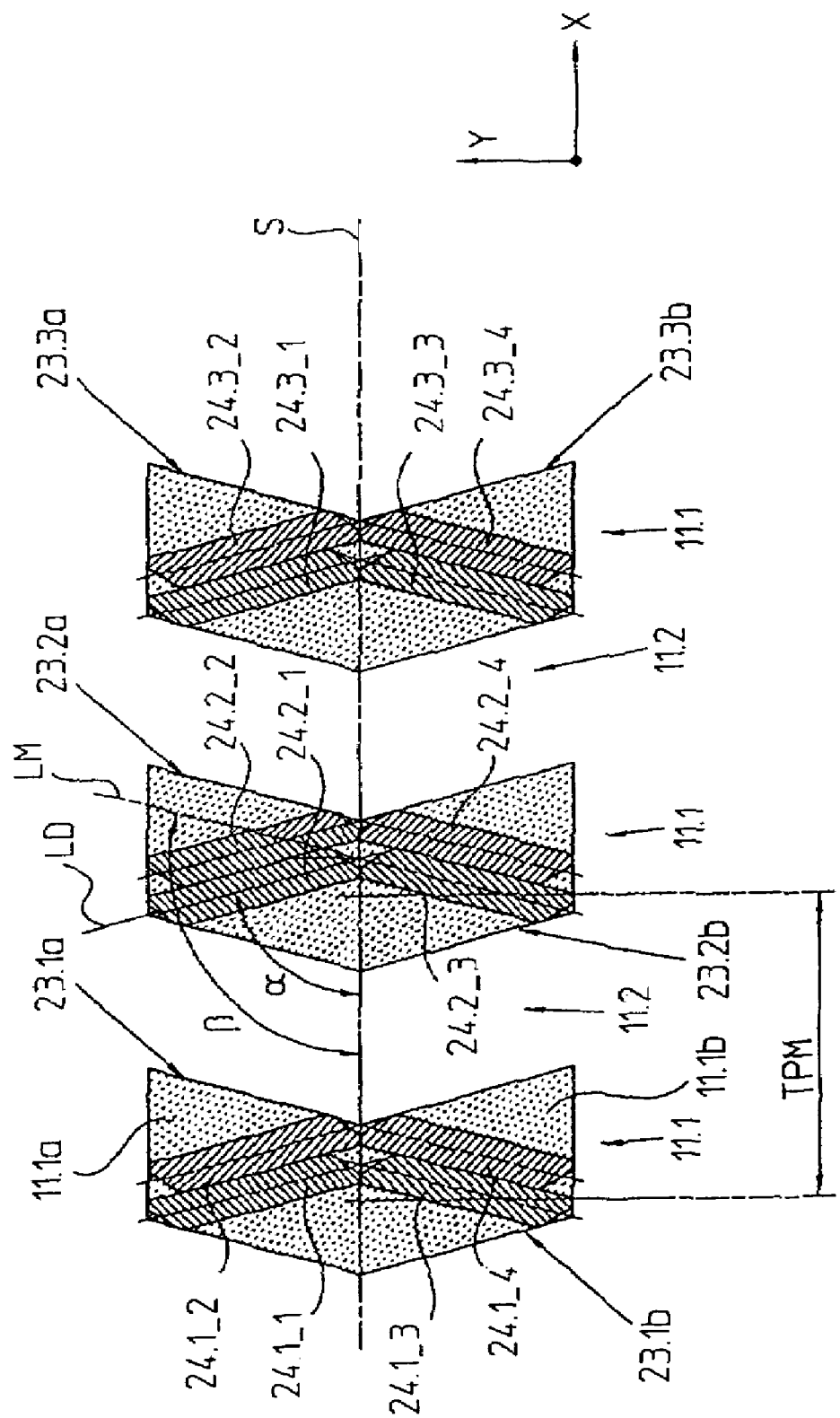
FIG. 2 is a schematic partial plan view of a first exemplary embodiment of an opto-electronic detector arrangement in connection with a first embodiment of the scanned measuring graduation in accordance with the present invention.

Reference is now made to FIG. 2 for a detailed explanation of the various steps of the present invention, which shows a portion of the opto-electronic detector arrangement 22 from FIG. 1 in the detection plane, along with an also schematic partial view from above on the scanned measuring graduation 10.

Several detector element units 23.1a, 23.1b, 23.2a, 23.2b, 23.3a, 23.3b of the detector arrangement are represented in FIG. 2, which are arranged with the periodicity TPM along the measuring direction x. In this case the periodicity TPM of the arrangement of the detector element units 23.1a, 23.1b, 23.2a, 23.2b, 23.3a, 23.3b, or of the centers, corresponds to the periodicity TPM of the scanned measuring graduation.

Several periods with graduation areas 11.1, 11.2 or 11.1a, 11.1b of the measuring graduation can be seen in FIG. 2, wherein graduation areas 11.1, 11.2 which adjoin each other in the measuring direction x each have different optical properties. Here, graduation areas opaque to light are identified by the reference numerals 11.1 or 11.1a and 11.1b, graduation areas transparent to light by the reference numeral 11.2.

In an advantageous embodiment, the complete detector arrangement 22 on the scanning side clearly includes more than the detector element units 23.1a, 23.1b, 23.2a, 23.2b, 23.3a, 23.3b visible in FIG. 2. The same applies to the scanned (actually ring-shaped) measuring graduation, of which only a small section can be seen in FIG. 2 and which also contains a plurality of graduation areas 11.1, 11.2 with different optical properties.

The detector arrangement provided in this example is sometimes also known as a so-called structured detector. It includes a multitude of detector elements or detector element units, which are employed for scanning a fringe pattern, which can be modulated as a function of displacement. It is important here that those respective detector elements or detector element units which generate equiphased scanning signals in the course of scanning the fringe pattern in the detection plane are electrically connected with each other. In this connection the generation of four scanning signals S0, S90, S180 and S270, each phase-shifted by 90°, which are processed in a known manner, are customary here. Accordingly, the signals from a whole group of suitably switched-together detector elements or detector element units contribute to the generation of each one of these scanning signals S0, S90, S180 and S270.

In accordance with the present invention, a respective partial filtering of undesired harmonic portions in the generated scanning signals is now assured by the design of the detector element units 23.1a, 23.1b, 23.2a, 23.2b, 23.3a, 23.3b on the scanning side, as well as by the suitable design of the graduation areas 11.1 on the measuring graduation side.

On the part of the scanning unit this is achieved in the instant example by the geometric shape and/or arrangement of the detector element units 23.1a, 23.1b, 23.2a, 23.2b, 23.3a, 23.3b. These respectively include one or several individual detector elements 24.1_1, 24.1_2, 24.1_3, 24.1_4, 24.2_1, 24.2_2, 24.2_3, 24.2_4, 24.3_1, 24.3_2, 24.3_3, 24.3_4 which, for example, are embodied in the form of known photo diodes. In the exemplary embodiment represented, respectively two detector elements of a specific geometric contour are provided per detector element unit 23.1a, 23.1b, 23.2a, 23.2b, 23.3a, 23.3b. However, in principle a detector element unit 23.1a, 23.1b, 23.2a, 23.2b, 23.3a, 23.3b could alternatively include only a single detector element.

In regard to the geometric shape of the detector elements 24.1_1, 24.1_2 suitable for harmonic filtering, in particular for the provision of a suitable contour thereof, explicit reference is made here to German Patent Application 103 19 609.9 of Applicant.

In this example, every detector element unit 23.1a, 23.1b, 23.2a, 23.2b, 23.3a, 23.3b is furthermore arranged tilted in relation to its respective longitudinal axis LD in the detection plane by a specific tilt angle $\alpha \neq 90°$ with respect to the measuring direction x. In this exemplary embodiment the tilt angle $\alpha$ is selected in such a way that the dimension of a detector element unit 23.1a, 23.1b, 23.2a, 23.2b, 23.3a, 23.3b in the measuring direction x extends over the length TPM/2.

As can be seen in FIG. 2, the opto-electronic detector arrangement has an axis of symmetry S, which is oriented parallel to the measuring direction x. In the present example, respective first and second detector element units 23.1a and 23.1b, 23.2a and 23.2b, as well as 23.3a, 23.3b, are arranged approximately V-shaped with respect to each other mirror-symmetrically with respect to the axis of symmetry S or, in FIG. 2 above and below the axis of symmetry S. This arrangement has been shown to be advantageous in that it is possible by the arrangement to achieve a greater assembly tolerance of the position measuring system. A sufficient signal amplitude and a good degree of modulation of the generated scanning signals, including harmonic filtering, is assured, even in the case of a not quite ideal installation of the scanning unit relative to the scanned measuring graduation.

Alternative variations for designing the detector element units on the part of the scanning unit in order to obtain a partial filtering effect therewith will be explained in the course of the further description.

In the present example it has been provided for the intended partial filtering of undesired harmonics to arrange the rhombus-shaped graduation areas 11.1, 11.2 in the measuring graduation in such a way that their longitudinal axes LM are arranged in the measuring plane tilted at an angle $\beta \neq 90°$ with respect to the measuring direction x. This means that the required partial filtering effect on the part of the measuring graduation is achieved here by the appropriate oblique placement of the graduation areas 11.1, 11.2.

As can be noted in FIG. 2, in the present example the measuring graduation also has an axis of symmetry S oriented parallel with respect to the measuring direction x, to which respectively first and second graduation areas 11.1a, 11.1b with identical optical properties have been arranged in a mirror-symmetrical manner, which adjoin each other in a V-shape. In this case the V-shaped arrangement of the first and second graduation areas of the measuring graduation has been selected to be exactly opposite, or rotated by 180°, in relation to the V-shaped arrangement of the detector element units 23.1a, 23.1b, 23.2a, 23.2b, 23.3a, 23.3b in the detector arrangement.

In the present example the angles $\alpha$ and $\beta$, which respectively characterize the slanted positions of the detector element units 23.1a, 23.1b, 23.2a, 23.2b, 23.3a, 23.3b and of the graduation areas 11.1, 11.2 in relation to the measuring direction x, are selected in such a way that, as can be seen in FIG. 2, gaps and lines of equal width are being formed on the side of the measuring graduation, or areas with and without detector element units on the side of the scanning unit. Stated differently, the geometry and arrangement of the detector element units 23.1a, 23.1b, 23.2a, 23.2b, 23.3a, 23.3b and of the graduation areas 11.1, 11.2 are matched to each other in such a way that the projection of each detector element unit exactly fits into a transparent or opaque graduation area.

In case of different filtering variations it is also possible in principle to select a geometry and arrangement of the detector element units and of the graduation areas in such a way that for example in a projection such a detector element unit projects by a defined amount past the graduation areas, etc. This can become necessary in case of the required filtering of other harmonics, for example.

In connection with the matching of the geometry and arrangement of the detector element units and of the graduation areas with respect to the respective partial filtering it should moreover be mentioned that the extension of the detector element units in the y-direction is advantageously selected to be approximately identical to the length of an angled graduation area on the side of the measuring graduation, such as represented in FIG. 2.

Further alternative variations for partial harmonic filtering using the opto-electronic detector arrangement and using the measuring graduation will be explained in what follows by FIGS. 3 to 5. Only the important differences from the extensively explained example in FIG. 2 will be addressed.

Figure 3:
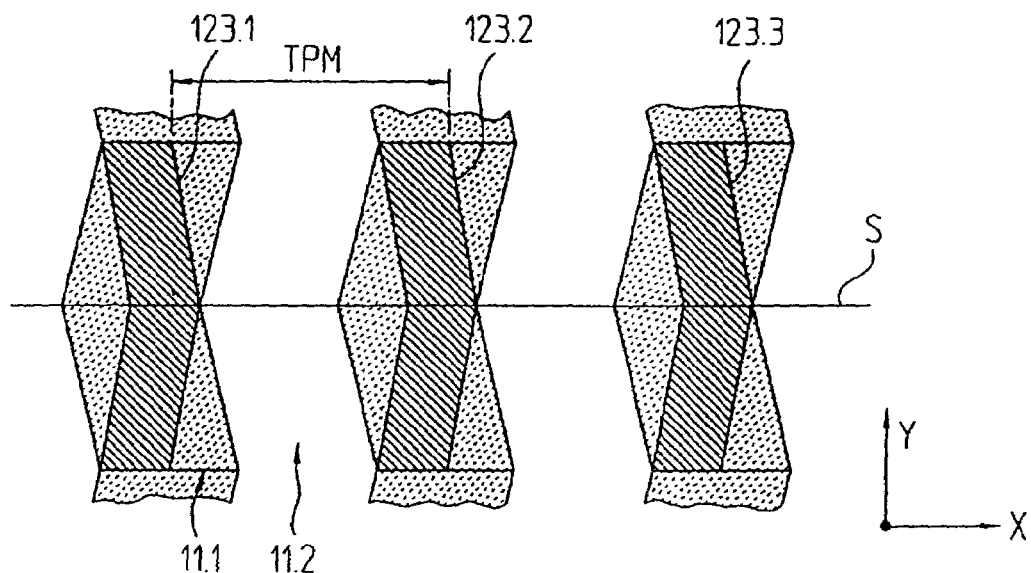
FIG. 3 is a schematic partial plan view of a second exemplary embodiment of an opto-electronic detector arrangement in connection with the first embodiment of the scanned measuring graduation in accordance with the present invention.

FIG. 3 shows a view from above on a portion of the measuring graduation embodied analogously to the example in FIG. 2, together with an alternative embodiment on the part of the detector arrangement. Only three detector element units 123.1, 123.2, 123.3 of the detector arrangement are again represented in FIG. 3. Again, the complete detector arrangement includes a plurality of such detector element units 123.1, 123.2, 123.3, which are arranged with the periodicity TPM in the measuring direction x.

In contrast to the previous example, the detector element units 123.1, 123.2, 123.3 now include only a single detector element. The detector elements are arranged in a V-shape in relation to the axis of symmetry S of the detector arrangement.

A V-shaped arrangement of the graduation areas 11.1, 11.2 is again provided on the part of the measuring graduation. To assure the same width of fringes and gaps on the part of the detector arrangement as well as on the part of the measuring graduation, an appropriately opposite V-shaped alignment, or angled arrangement, of the graduation areas 11.1, 11.2 or of the detector element units 123.1, 123.2, 123.3 is provided.

In this connection it is basically not absolutely necessary to provide the same angles on the side of the detector arrangement or of the measuring graduation. Thus, the embodiment shown in FIG. 3 merely represents a special case. Thus, it can be necessary for example to select the angles in such a way that, in a projection on the graduation areas, the detector element units project past them a certain distance in the x direction if, for example, filtering of specific harmonics is necessary.

It has again been shown to be advantageous in principle if the length of the detector element units 123.1, 123.2, 123.3 in the y-direction is selected to be approximately identical to the length of an angled graduation area.

In order to again assure the largest possible tolerances with respect to the assembly of the scanning unit and the measuring graduation, it is advantageous if, as indicated in FIG. 3, additional angled graduation areas follow in the y-direction. Thus a sort of zig-zag structure of the graduation areas 11.1, 11.2 in the y-direction of the periodicity of a length of a detector element unit 123.1, 123.2, 123.3 results. In this case it is possible in principle to select the total length of the graduation areas in the y-direction in accordance with the demands made on the required position tolerances.

Figure 4:
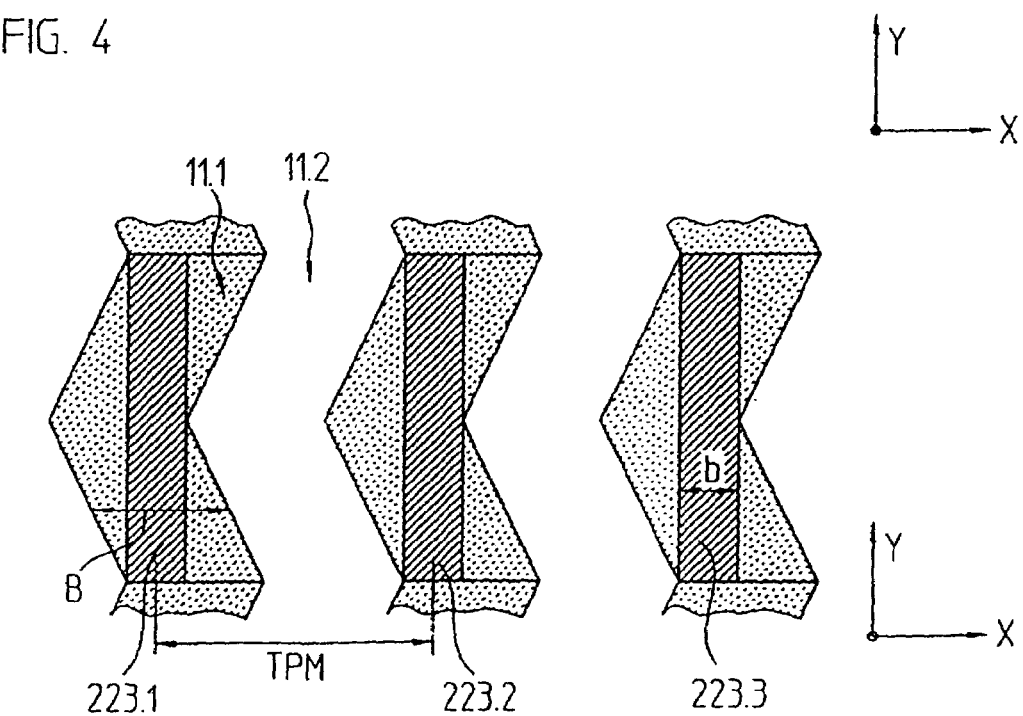
FIG. 4 is a schematic partial plan view of a third exemplary embodiment of an opto-electronic detector arrangement in connection with a second variation of the scanned measuring graduation in accordance with the present invention.
Figure 5:
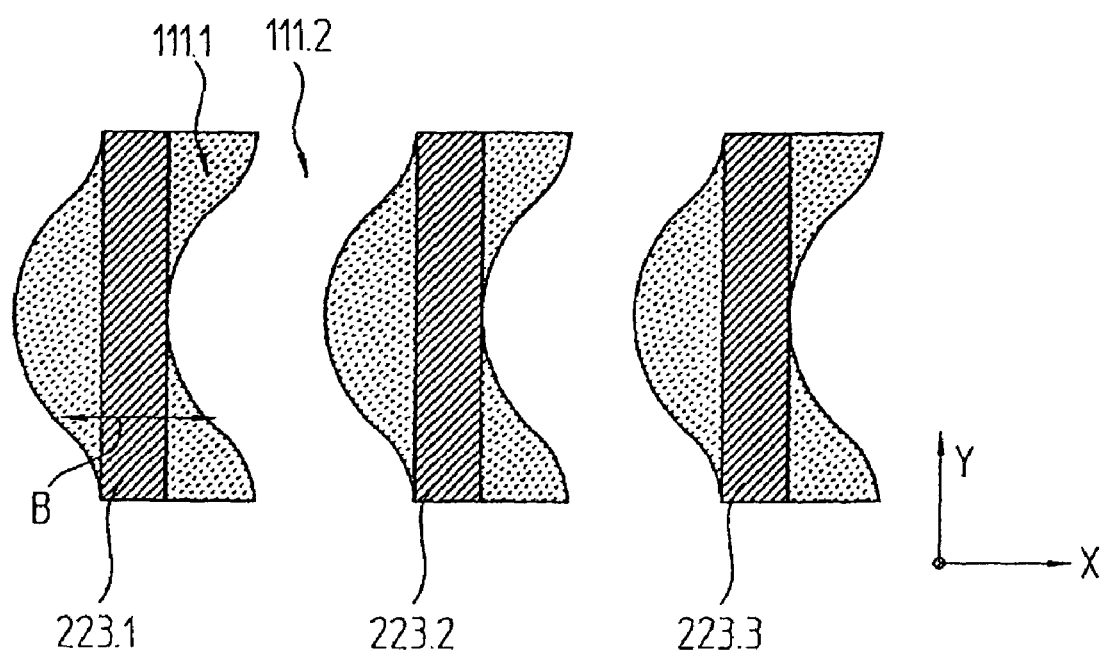
FIG. 5 is a schematic partial plan view of the third exemplary embodiment of the opto-electronic detector arrangement of FIG. 4 in connection with a third variation of the scanned measuring graduation in accordance with the present invention.

Two further variants of the position measuring system in accordance with the present invention are schematically represented in FIGS. 4 and 5. Respectively rectangular-shaped detector element units 223.1, 223.2, 223.3 are provided on the part of the detector arrangement, which are arranged adjoining each other at a spacing TPM in the measuring direction x and again only comprise a single rectangular-shaped detector element. The longitudinal axis of the latter is arranged at right angles in relation to the measuring direction x. On the scanning side, the partial filtering effect can be assured with such detector element units 223.1, 223.2, 223.3 by means of the suitable selection of the width b of the detector element units 223.1, 223.2, 223.3 in the measuring direction x, and in the case of the angled graduation areas by the selection of suitable angles, as explained above.

In FIG. 4, an embodiment with a V-shaped or angled alignment of the graduation areas 11.1, 11.2 is provided on the part of the measuring graduation. The width B of the graduation areas 11.1, 11.2 is selected to be constant over their entire extension in the y-direction as B=TPM/2.

A different option for partial harmonic filtering on the part of the measuring graduation is suggested in FIG. 5. There, the graduation areas 111.1, 111.2 of different optical properties each have sinusoidal contours extending in the y-direction, vertically in a measuring graduation plane with respect to the measuring direction, or sinusoidal edges. It is also possible to provide a partial harmonic filtering on the part of the measuring graduation by the provision of such contours. As in the example represented, the periodicity of the sinusoidal edge function corresponds to the length of one detector element unit 123.1, 123.2, 123.3 in the y-direction, or a whole-number fraction thereof. The width B of the graduation areas 11.1, 11.2 is selected to be constant over the entire extension in the y-direction and is B=TPM/2.

The steps for harmonic filtering on the part of the scanning unit and the measuring graduation discussed in the examples by the different drawing figures can of course also be suitably combined with each other, etc. Thus, a number of further design options exists within the scope of the present invention, which are all based on the above discussed principles.

Further exemplary embodiments exist within the scope of the present invention besides the described examples.

I claim:

1. An optical position measuring system for generating position-dependent scanning signals, comprising:
   a measuring graduation;
   a scanning unit that is movable in relation to said measuring graduation in a measuring direction, said scanning unit comprises:
   a light source that generates light towards said measuring graduation so that scanning signals result from an interaction of said light with said measuring graduation; and
   an opto-electronic detector arrangement comprising a plurality of detector element units, whose geometric shape and/or arrangement has been selected in such a way that through said plurality of detector element units at least a partial filtering of undesired harmonics out of said scanning signals results and wherein each of said plurality of detector element units has a longitudinal axis, which is arranged in a detection plane tilted at a tilt angle $\alpha \neq 90°$ in relation to said measuring direction and said plurality of detector element units are arranged along said measuring direction with a second periodicity, and each of said plurality of detector element units comprises one or several individual detector elements; and wherein said opto-electronic detector arrangement has an axis of symmetry, which is oriented parallel with respect to said measuring direction, and wherein a first and a second one of said plurality of detector element units are arranged in a V-shape with respect to each other and mirror-symmetrically in relation to said axis of symmetry; and wherein said measuring graduation comprises an arrangement of graduation areas with different optical properties, which is periodic in said measuring direction and has a periodicity and which has been selected in such a way that through said arrangement of graduation areas at least a partial filtering of undesired harmonics out of said scanning signals results.

2. The optical position measuring system in accordance with claim 1, wherein each of said plurality of detector element units has a geometric contour in such a way that through them at least a partial filtering of undesired harmonics in the scanning signals results.

3. The optical position measuring system in accordance with claim 1, wherein said graduation areas of said measuring graduation are embodied to be either i) transparent and opaque, or ii) highly-reflecting or low reflecting.

4. The optical position measuring system in accordance with claim 1, wherein said scanning unit and said measuring graduation can be moved linearly or rotationally with respect to each other.

5. The optical position measuring system in accordance with claim 1, wherein said plurality of detector element units comprises a first and a second detector element unit that generate equiphased scanning signals and are connected with each other in an electrically conducting manner.

6. An optical position measuring system for generating position-dependent scanning signals, comprising:

a measuring graduation;

a scanning unit that is movable in relation to said measuring graduation in a measuring direction, said scanning unit comprises:

a light source that generates light towards said measuring graduation so that scanning signals result from an interaction of said light with said measuring graduation; and an opto-electronic detector arrangement comprising a plurality of detector element units, whose geometric shape and/or arrangement has been selected in such a way that through said plurality of detector element units at least a partial filtering of undesired harmonics out of said scanning signals results, and wherein each of said plurality of detector element units has a longitudinal axis, which is arranged in a detection plane tilted at a tilt angle $\alpha \neq 90°$ in relation to said measuring direction and wherein said plurality of detector element units are arranged along said measuring direction with a second periodicity, and each of said plurality of detector element units comprises one or several individual detector elements and wherein said tilt angle of said detector element units is selected in such a way in that, in its projection, respectively one detector element unit fits exactly into a transparent or opaque graduation area;

wherein said measuring graduation comprises an arrangement of graduation areas with different optical properties, which is periodic in said measuring direction and has a periodicity and which has been selected in such a way that through said arrangement of graduation areas at least a partial filtering of undesired harmonics out of said scanning signals results.

7. The optical position measuring system in accordance with claim 6, wherein said scanning unit and said measuring graduation can be moved linearly or rotationally with respect to each other.

8. The optical position measuring system in accordance with claim 6, wherein said plurality of detector element units comprises a first and a second detector element unit that generate equiphased scanning signals and are connected with each other in an electrically conducting manner.

9. An optical position measuring system for generating position-dependent scanning signals, comprising:

a measuring graduation;

a scanning unit that is movable in relation to said measuring graduation in a measuring direction, said scanning unit comprises:

a light source that generates light towards said measuring graduation so that scanning signals result from an interaction of said light with said measuring graduation; and an opto-electronic detector arrangement comprising a plurality of detector element units, whose geometric shape and/or arrangement has been selected in such a way that through said plurality of detector element units at least a partial filtering of undesired harmonics out of said scanning signals results, and wherein said measuring graduation comprises an arrangement of graduation areas with different optical properties, which is periodic in said measuring direction and has a periodicity and which has been selected in such a way that through said arrangement of graduation areas at least a partial filtering of undesired harmonics out of said scanning signals results, wherein each of said graduation areas of said measuring graduation has a longitudinal axis, which is arranged tilted in a measuring plane at a tilt angle $\beta \neq 90°$ with respect to said measuring direction;

wherein said tilt angle of said graduation area is selected in such a way in that, in its projection, respectively one detector element unit fits exactly into a transparent or opaque graduation area.

10. The optical position measuring system in accordance with claim 9, wherein said plurality of detector element units are arranged along said measuring direction with a second periodicity, and each of said plurality of detector element units comprises one or several individual detector elements.

11. The optical position measuring system in accordance with claim 9, wherein said scanning unit and said measuring graduation can be moved linearly or rotationally with respect to each other.

12. The optical position measuring system in accordance with claim 9, wherein said plurality of detector element units comprises a first and a second detector element unit that generate equiphased scanning signals and are connected with each other in an electrically conducting manner.

* * * * *